(12) United States Patent
Kambegawa

(10) Patent No.: US 9,794,429 B2
(45) Date of Patent: Oct. 17, 2017

(54) SERVER APPARATUS STORING PRINT DATA, PRINTING APPARATUS, AND PRINTING SYSTEM FOR CHECKING PROCESSING STATUS ON A PRINT DATA LIST

(71) Applicant: CANON KABUSHIKI KAISHA, Tokyo (JP)

(72) Inventor: Minoru Kambegawa, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/749,468

(22) Filed: Jun. 24, 2015

(65) Prior Publication Data
US 2015/0381827 A1 Dec. 31, 2015

(30) Foreign Application Priority Data
Jun. 27, 2014 (JP) ................................ 2014-132527

(51) Int. Cl.
*H04N 1/00* (2006.01)
*H04N 1/32* (2006.01)

(52) U.S. Cl.
CPC ....... *H04N 1/0023* (2013.01); *H04N 1/00244* (2013.01); *H04N 1/00408* (2013.01); *H04N 1/32101* (2013.01); *H04N 1/32523* (2013.01); *H04N 2201/0094* (2013.01); *H04N 2201/3221* (2013.01)

(58) Field of Classification Search
CPC ............. H04N 1/0023; H04N 1/00244; H04N 1/32523; H04N 1/00408; H04N 1/32101; H04N 2201/0094; H04N 2201/3221

USPC ........................................................ 358/1.15
See application file for complete search history.

(56) References Cited

U.S. PATENT DOCUMENTS

| | | | | |
|---|---|---|---|---|
| 7,057,753 | B1 * | 6/2006 | Kajita ................ | H04N 1/00222 358/1.15 |
| 8,547,566 | B2 * | 10/2013 | Isshiki .................. | G06F 3/1203 358/1.14 |
| 2004/0141202 | A1 * | 7/2004 | Okigami ................. | G06F 3/121 358/1.15 |
| 2012/0236325 | A1 * | 9/2012 | Abe ....................... | G06F 3/1208 358/1.2 |
| 2013/0003118 | A1 * | 1/2013 | Ito .......................... | G06F 3/1208 358/1.15 |

(Continued)

FOREIGN PATENT DOCUMENTS

JP 2006-099714 A 4/2006

*Primary Examiner* — Allen H Nguyen
(74) *Attorney, Agent, or Firm* — Canon U.S.A., Inc. IP Division

(57) ABSTRACT

A server apparatus includes a first receiving unit configured to receive print data transmitted from a client apparatus, a storage unit configured to store the print data of which reception has finished by the first receiving unit, and a second receiving unit configured to receive, from a printing apparatus, a request of print data, and a transmission unit configured to, in response to the request received by the second receiving unit, transmit a list of print data to the printing apparatus, the list of print data including identification information of the print data stored in the storage unit and identification information of print data of which reception has been started but has not finished by the first reception unit yet.

29 Claims, 18 Drawing Sheets

(56) References Cited

U.S. PATENT DOCUMENTS

| | | | |
|---|---|---|---|
| 2013/0003125 A1* | 1/2013 | Morii | G06K 15/1817 358/1.15 |
| 2013/0088751 A1* | 4/2013 | Yoshida | G06F 3/1203 358/1.15 |
| 2015/0002882 A1* | 1/2015 | Nakajima | G06F 3/1218 358/1.14 |

* cited by examiner

FIG.6

110 PRINT DATA INFORMATION

| 111 | 112 | 113 | 114 | 115 | 116 | 117 | 118 | 119 | 129 |
|---|---|---|---|---|---|---|---|---|---|
| PRINT DATA IDENTIFIER | USER INFORMATION | DOCUMENT NAME | RECEIVING STATUS | PRINTING STATUS | RECEIVING DATE AND TIME | PROCESSING | PRINTING APPARATUS IDENTIFIER | NUMBER OF PAGES | NUMBER OF COPIES |
| 001 | tanaka | PROPOSAL | RECEIVED | PRINTING | 2013/06/18 14:56 | — | — | 3 | 1 |
| 002 | suzuki | QUOTATION A | RECEIVED | UNPRINTED | 2013/06/18 15:00 | — | — | 2 | 2 |
| 003 | suzuki | QUOTATION B | RECEIVING | UNPRINTED | — | — | — | — | 2 |
| 004 | tanaka | INVOICE | ERROR | UNPRINTED | — | — | — | — | 2 |

FIG.7

120 PRINT DATA LIST REQUEST

| USER INFORMATION (121) | PRINTING APPARATUS IDENTIFIER (122) |
|---|---|
| suzuki | 192.168.1.1 |

FIG.8

130 PRINT DATA LIST

| PRINT DATA IDENTIFIER | DOCUMENT NAME | RECEIVING STATUS | RECEIVING DATE AND TIME | NUMBER OF PAGES | NUMBER OF COPIES |
|---|---|---|---|---|---|
| 0002 | QUOTATION A | RECEIVED | 2013/06/18 15:00 | 2 | 2 |
| 0003 | QUOTATION B | RECEIVING | — | — | 2 |

140 PRINTING INSTRUCTION

| PROCESSING | PRINT DATA IDENTIFIER | PRINTING APPARATUS IDENTIFIER |
|---|---|---|
| PRINT | 0003 | 192.168.1.1 |

141 / 142 / 146

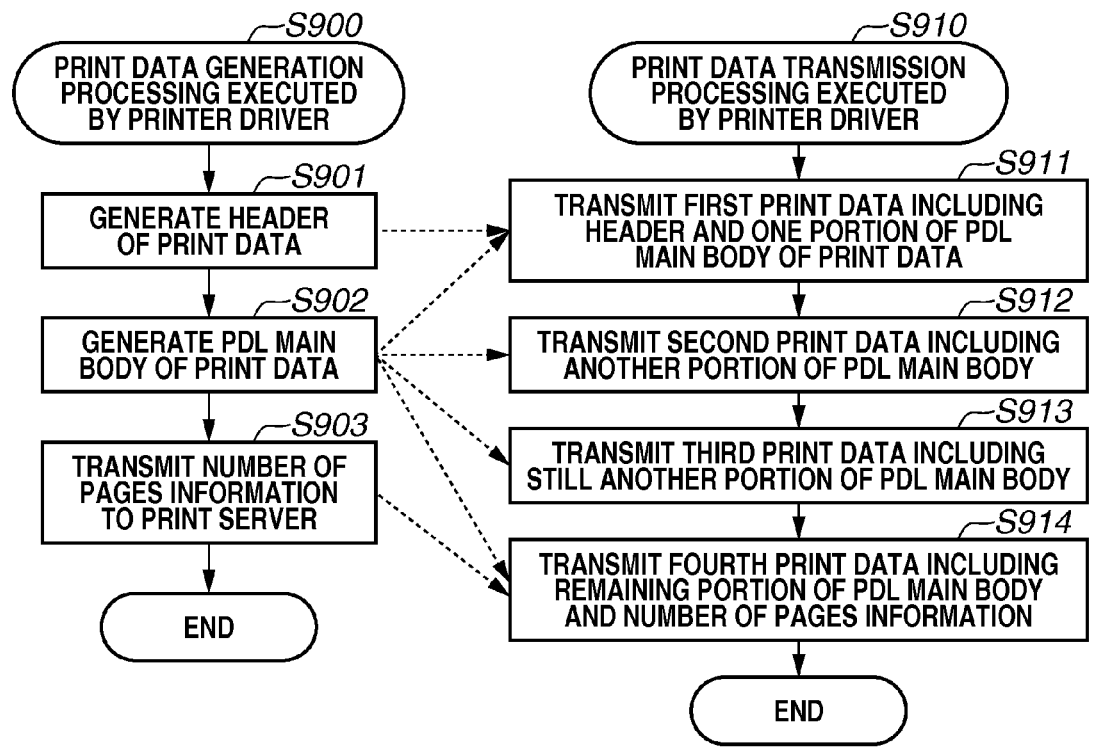
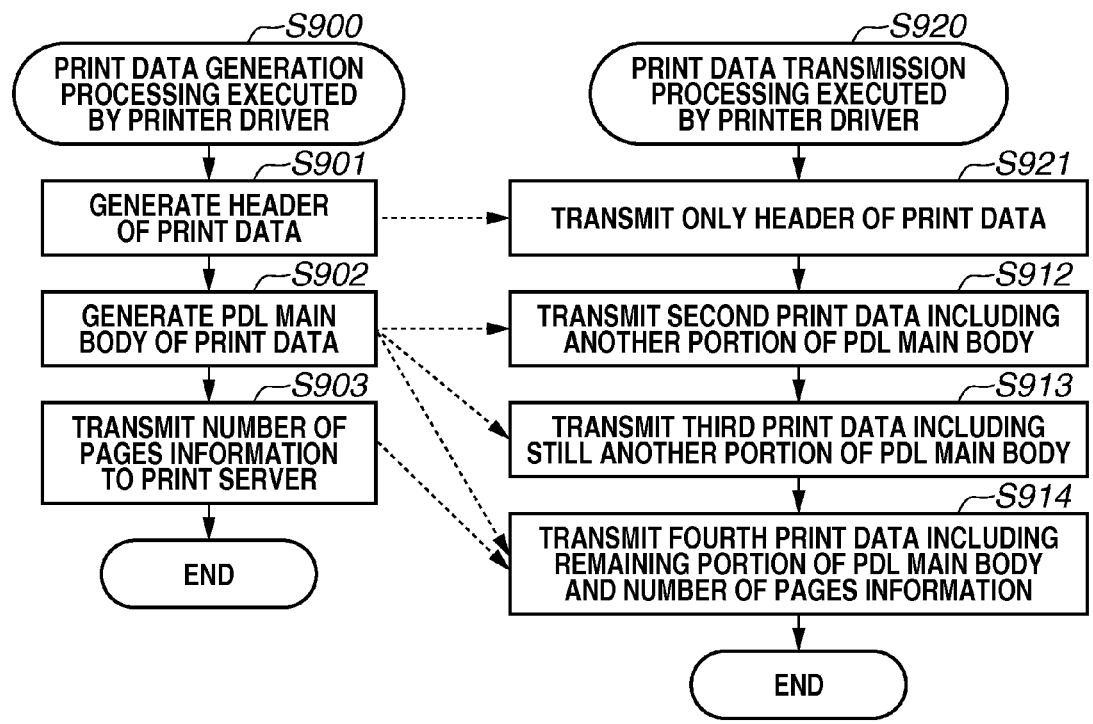

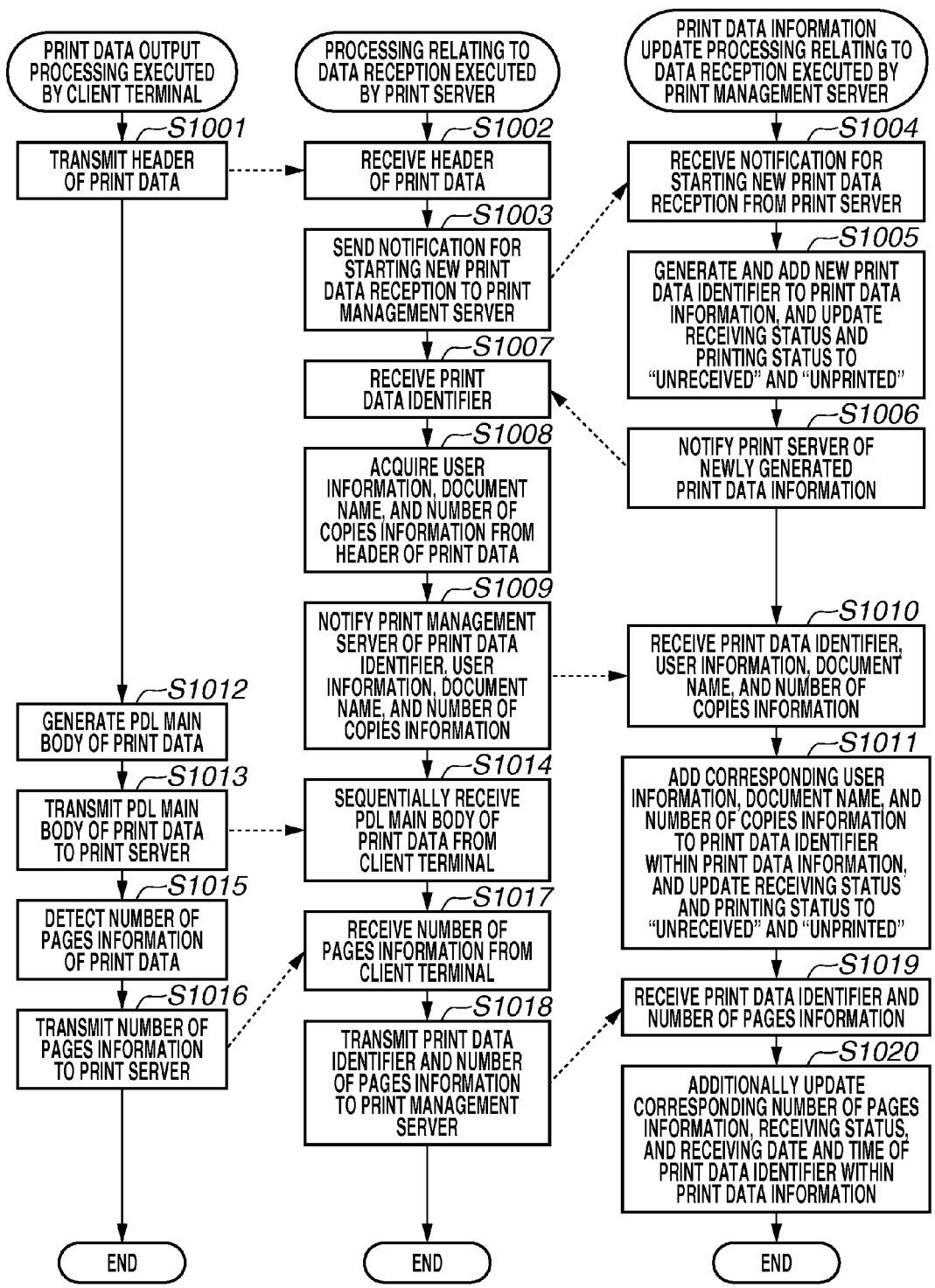

FIG.13

| | DOCUMENT NAME | NUMBER OF PAGES | NUMBER OF COPIES | DATE AND TIME |
|---|---|---|---|---|
| ☐ | QUOTATION A | 2 | 2 | 2013/06/18 15:00 |
| ☐ | QUOTATION B | — | 2 | RECEIVING |

SELECT ALL | CLEAR SELECTION | DELETE | RESERVE | PRINT

FIG.17

160 PRINT DATA LIST

| PRINT DATA IDENTIFIER | DOCUMENT NAME | RECEIVING STATUS | RECEIVING DATE AND TIME | NUMBER OF PAGES | NUMBER OF COPIES |
|---|---|---|---|---|---|
| 0002 | QUOTATION | RECEIVED | 2013/06/18 15:00 | 2 | 2 |
| 0003 | QUOTATION | ERROR | — | — | 2 |

*170* DELETION INSTRUCTION

| PROCESSING | PRINT DATA IDENTIFIER | PRINTING APPARATUS IDENTIFIER |
|---|---|---|
| DELETE | 0004 | 192.168.1.1 |

*171*     *172*     *176*

SERVER APPARATUS STORING PRINT DATA, PRINTING APPARATUS, AND PRINTING SYSTEM FOR CHECKING PROCESSING STATUS ON A PRINT DATA LIST

BACKGROUND OF THE INVENTION

Field of the Invention

The present invention relates to a server apparatus storing print data, a printing apparatus, and a printing system.

Description of the Related Art

There is provided a printing system known as "pull-print system". In the pull-print system, authentication of a user is executed by a printing apparatus, and a printing request for user's print data stored in a print management server is provided from the printing apparatus, so that the print data is printed by the printing apparatus. According to the pull-print printing system, because print data corresponding to an authenticated user is printed by a printing apparatus, security thereof can be improved.

Japanese Patent Application Laid-Open No. 2006-99714 discusses the following printing system. According to the above-described printing system, integrated circuit (IC) card authentication processing is executed by a multifunction peripheral, and print data of an authenticated user is identified by a print management server. Then, a printing command is transmitted to a print server that stores the identified print data, so that the print data of the authenticated user is printed by a desired printer.

In the above-described printing system, print data and bibliographic information data received from an application program are stored in the print server and the print management server, so that the printing processing is executed by a desired printing apparatus according to an output instruction.

According to the printing system discussed in Japanese Patent Application Laid-Open No. 2006-99714, in order to improve the security of the printing system, printing processing employing the IC card authentication can be executed. However, displaying a list for inputting a printing instruction on a desired printing apparatus may require time.

More specifically, in the above-described printing system, print data is managed according to the bibliographic information. Therefore, the printing system waits until transmission of the print data is completed, and when it is determined that the transmission thereof is completed, the printing system generates a bibliographic information file. This is because the information such as a name of the print data, an owner's name (a name of sender's computer), and the number of pages are included in the bibliographic information within the bibliographic information file, and the information such as the number of pages cannot be determined until receiving processing of the print data is completed. Further, in a case where a total number of pages for the print data is provided by a printer driver as the attribute information of the print data, the print data will not be regarded as received officially until the print server (i.e., print data storage server) has completed the receiving processing of the print data.

Therefore, in practice, the bibliographic information file is created after the print data has been received completely. Then, when the printing apparatus receives the bibliographic information file, the print data is displayed as a list of data on which the user can provide an output instruction.

Therefore, in a case where a printing operation of the print data having a large number of pages or a large volume of data is to be executed, unless spooling and transmission processing of the print data (i.e., receiving processing executed by the print server) has been completed, the user cannot provide a printing instruction because a list relating to that print data will not be displayed on the printing apparatus.

The user cannot know the time taken by the printing apparatus to display a list after the user has executed the printing operation on the application. Therefore, in a case where a list of desired print data is not displayed on the printing apparatus, the user has to stay at the installation site of the printing apparatus to repeatedly reload a list display screen.

SUMMARY OF THE INVENTION

The present invention is directed to a system capable of checking a processing status on a print data list that includes a status of transmitted print data on a printing apparatus even if receiving processing of the print data transmitted to a server apparatus from an information processing apparatus has not yet been completed.

According to an aspect of the present invention, a server apparatus includes a first receiving unit configured to receive print data transmitted from a client apparatus, a storage unit configured to store the print data of which reception has finished by the first receiving unit, and a second receiving unit configured to receive, from a printing apparatus, a request of print data, and a transmission unit configured to, in response to the request received by the second receiving unit, transmit a list of print data to the printing apparatus, the list of print data including identification information of the print data stored in the storage unit and identification information of print data of which reception has been started but has not finished by the first reception unit yet.

According to another aspect of the present invention, a printing apparatus includes a request unit configured to request a list of print data to a server apparatus, an acquisition unit configured to acquire a list of print data including identification information of the print data stored in the server apparatus and identification information of print data having been transmitted from a client apparatus but not yet having been received, from the server apparatus, and a display unit configured to display the list acquired by the acquisition unit.

According to the present invention, even if the receiving processing of the print data transmitted to the server apparatus from the information processing apparatus has not yet been completed, the processing status can be checked on a print data list including a status of the transmitted print data on the printing apparatus.

Further features of the present invention will become apparent from the following description of exemplary embodiments with reference to the attached drawings.

BRIEF DESCRIPTION OF THE DRAWINGS

FIG. 6 is a table illustrating print data information stored in a print server.

FIG. 7 is a table illustrating a print data list request to be transmitted to a print management server.

FIG. 8 is a table illustrating a print data list to be transmitted to the printing apparatus.

FIG. 9 is a table illustrating a printing instruction to be transmitted to the print management server.

FIGS. 10A and 10B are flowcharts illustrating a control method of an information processing apparatus.

FIG. 11 is a flowchart illustrating a data processing method of the printing system.

FIG. 13 is diagram illustrating a user interface (UI) screen to be displayed on the printing apparatus.

FIG. 17 is a table illustrating a print data list.

FIG. 18 is a table illustrating a configuration of a deletion instruction to be transmitted from the printing apparatus.

DESCRIPTION OF THE EMBODIMENTS

Figure 1:
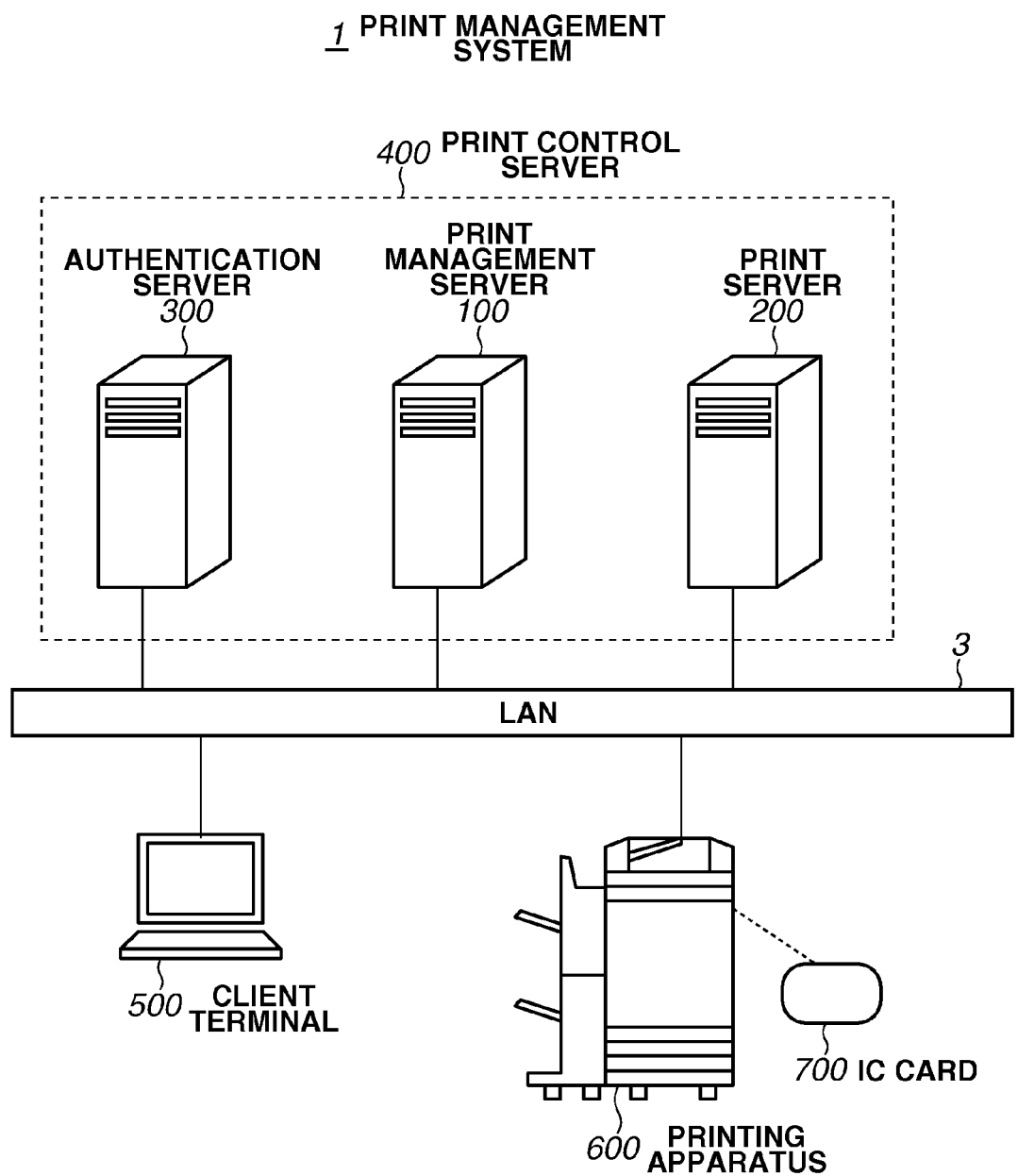
FIG. 1 is a diagram illustrating a configuration of a printing system to which a printing apparatus is applied.

Hereinafter, exemplary embodiments of a printing system will be described in detail with reference to the appended drawings. In the below-described exemplary embodiment and the appended drawings, the same reference numerals are assigned to the constituent elements having substantially the same functional configurations, and duplicative descriptions thereof will be omitted.

<System Configuration>

FIG. 1 is a diagram illustrating a configuration of a printing system according to a first exemplary embodiment to which a printing apparatus is applied. A configuration of a printing system 1 illustrated in FIG. 1 is merely an example, and various configurations are possible according to the use or the purpose.

In FIG. 1, the printing system 1 is configured of a print management server 100, a print server 200, an authentication server 300, one or more client terminals 500, and one or more printing apparatuses 600 serving as printers, which are communicably connected to each other via a network such as a local area network (LAN) 3.

The print management server 100 manages printing processing of print data stored in the print server 200. More specifically, the print management server 100 stores print data information (described below referring to FIG. 6) corresponding to bibliographic information of the print data stored in the print server 200. For example, the print data information may be a table in which owner information (i.e., user identification information indicating a user) of the print data is associated with the print data (i.e., print data identification information). Further, a term "print" represents the output processing executed by the printing apparatus 600, which includes not only the printing processing executed on a paper medium but also the output processing for displaying a preview.

According to a print data list request transmitted from the printing apparatus 600, the print management server 100 searches the print data information (see FIG. 6) and transmits a print data list corresponding to a user identifier (owner information) included in the print data list request. The print data information is attribute information of the print data, and is managed by a bibliographic information database (i.e., bibliographic information storage unit) included in the print server 200. Based on a printing instruction provided from the printing apparatus 600, the print management server 100 transmits a printing execution instruction of the print data identified by the printing instruction to the print server 200 that stores the print data corresponding to that printing instruction.

The print server 200 temporarily stores the print data received from the client terminal 500. The print server 200 generates print data information serving as the attribute information of the print data from the print data received from the client terminal 500, and transmits the print data information to the print management server 100. Further, the print server 200 may also include the bibliographic information database for managing the print data information. Then, based on the printing execution instruction transmitted from the print management server 100, the print server 200 transmits the print data identified by the printing execution instruction to the printing apparatus 600.

The authentication server 300 executes authentication processing when the user who operates the client terminal 500 logs into the printing apparatus 600. A user name, a password, and/or a card number are used as the authentication information (user identification information). At least any of the above authentication information (i.e., user identification information) is stored in an IC card 700, so that the user holds the IC card 700 over a card reader provided on the printing apparatus 600 to input the authentication information (user identification information) to the printing apparatus 600. Alternatively, the user may directly input the authentication information (user identification information) through an operation unit of the printing apparatus 600. The authentication server 300 stores an IC card authentication table and executes authentication processing by using the IC card authentication table when the authentication server 300 receives the card information of the IC card 700 from the printing apparatus 600. The user can use the printing apparatus 600 after the authentication server 300 executes the authentication processing.

The client terminal 500 is a terminal apparatus used by the user. A document printing program is installed in the client terminal 500. The document printing program is a program for printing a document through a printer driver installed in the client terminal 500. For example, the document printing program may be word processing software, spreadsheet software, or business form printing software. The client terminal 500 creates data used for printing processing through the document printing program, converts the data into print data through the printer driver, and transmits the print data to the print server 200.

The printing apparatus 600 executes printing processing of the print data. The printing apparatus 600 includes a screen such as a liquid crystal screen on the operation unit. The printing apparatus 600 includes an input interface allowing a user to perform operations such as inputting a printing instruction through the screen provided on the operation unit. Such a screen may be provided on the operation unit of the printing apparatus 600, or may be externally connected to the printing apparatus 600.

The print management server 100 stores an execution program and an operating system (OS) program in a random access memory (RAM) or an external memory. The print server 200 stores print data information, print data, an execution program, and an OS program in a RAM or an external memory. The authentication server 300 stores an IC card authentication table, an execution program, and an OS program in a RAM or an external memory. The printing apparatus 600 stores a printing program, an authentication program, and an OS program in a RAM or a hard disk drive (HDD).

In addition, the print management server 100, the print server 200, and the authentication server 300 may be configured as individual apparatuses (i.e., separate apparatuses), or may be integrally configured as a print control server 400 (i.e., single apparatus).

Further, respective functions of the print management server 100, the print server 200, and the authentication server 300 may be configured as separate pieces of processing, and respective pieces of processing may be executed in cooperation with each other. In the present exemplary embodiment, because the print management server 100, the print server 200, and the authentication server 300 are described as separate apparatuses, the functions thereof are respectively described as data transmission processing and data receiving processing. However, the present invention is not limited to the above-described configuration, and any configurations are possible there for as long as data communication can be executed between respective pieces of processing.

Further, the respective functions of the print management server 100, the print server 200, and the authentication server 300 may be realized with a single application (i.e., single piece of processing). If the functions are realized with a plurality of pieces of processing, the processing load can be distributed and processing delay can be prevented. However, in a small office/home office (SOHO) environment, the functions may be realized with a single application (i.e., single piece of processing) because the processing load thereof is not so great, and thus such a configuration is also included in the present invention.

Further, the bibliographic database for managing the print data information may be provided on the print server 200, or may be provided on the print management server 100.

Subsequently, hardware configurations of the print management server 100, the print server 200, the authentication server 300, the client terminal 500, and the printing apparatus 600 will be described with reference to FIGS. 2 and 3.

Figure 2:
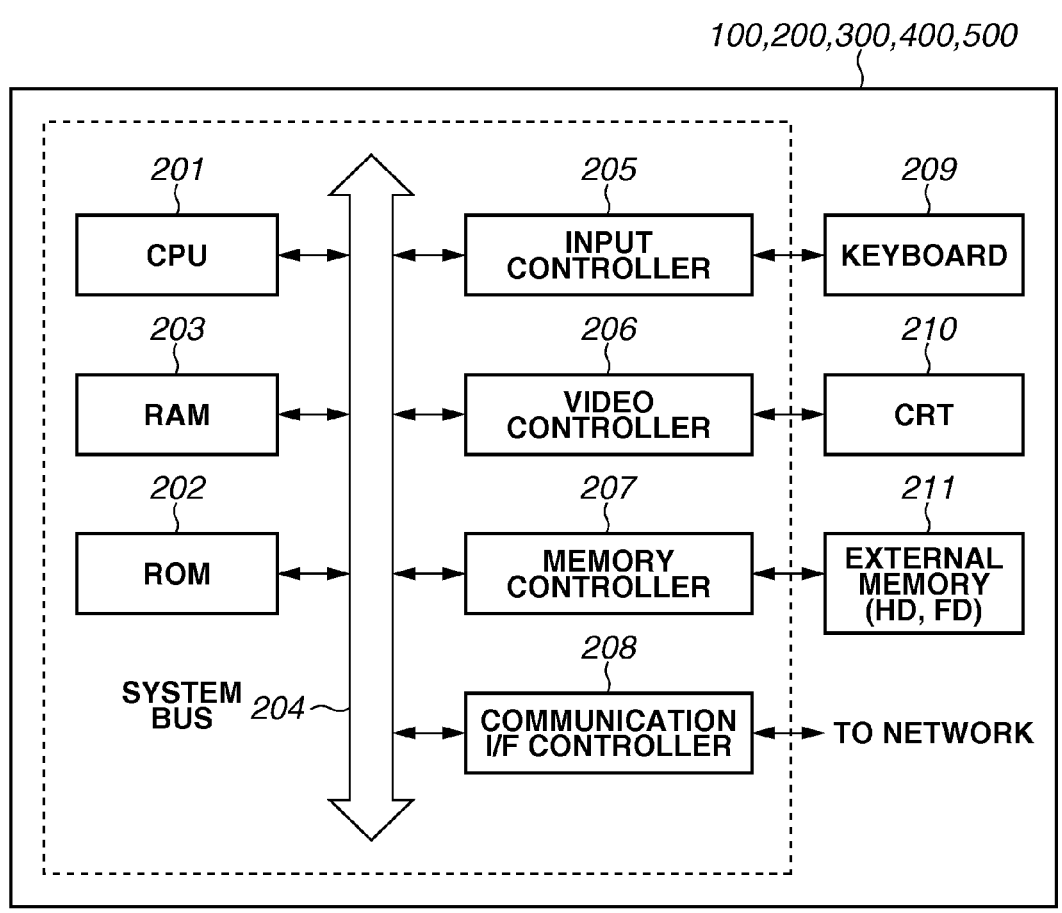
FIG. 2 is a block diagram illustrating a hardware configuration of the printing system illustrated in FIG. 1.

FIG. 2 is a block diagram illustrating a hardware configuration of an information processing apparatus applicable to the print management server 100, the print server 200, the authentication server 300, the print control server 400, and the client terminal 500 illustrated in FIG. 1.

In FIG. 2, a central processing unit (CPU) 201 integrally controls respective devices and controllers connected to a system bus 204. A control program of the CPU 201 such as a basic input/output system (BIOS), an OS, and various programs necessary to realize the functions executed by respective servers or client terminals are stored in a read only memory (ROM) 202 and/or the external memory 211. A RAM 203 functions as a main memory and a work area of the CPU 201. The CPU 201 loads a program necessary to execute the processing onto the RAM 203 and executes the program to realize various operations.

An input controller 205 controls an input from a pointing device such as a keyboard 209 or a mouse (not illustrated). A video controller 206 controls display on a display unit such as a cathode-ray tube (CRT) display 210. The display unit may be a liquid crystal display instead of the CRT display. The above-described units are used by a manager as necessary, and they are not directly related to the present invention.

A memory controller 207 controls the access to the external memory 211 such as a hard disk (HD), a floppy disk (FD) (registered mark), or a compact flash memory (registered mark) connected to a personal computer memory card international association (PCMCIA) card slot via an adapter. The external memory 211 stores a boot program, browser software, various application programs, font data, a user file, an edit file, and various kinds of data. A communication interface (I/F) controller 208 executes control processing of network communication in order to enable the information processing apparatus to connect to and communicate with an external apparatuses via the network. For example, the information processing apparatus can execute internet communication using a transmission control protocol/internet protocol (TCP/IP). Further, the CPU 201 executes rasterizing processing of an outline font onto an information display region within the RAM 203, so that the information can be displayed on the CRT display 210. Furthermore, the CPU 201 enables a user instruction to be input through a mouse cursor (not illustrated) on the CRT display 210.

The program for realizing the present exemplary embodiment is stored in the external memory 211, so that the CPU 201 loads the program onto the RAM 203 as necessary to execute the program. Further, a definition file and various information tables used for executing the program are also stored in the external memory 211.

Figure 3:
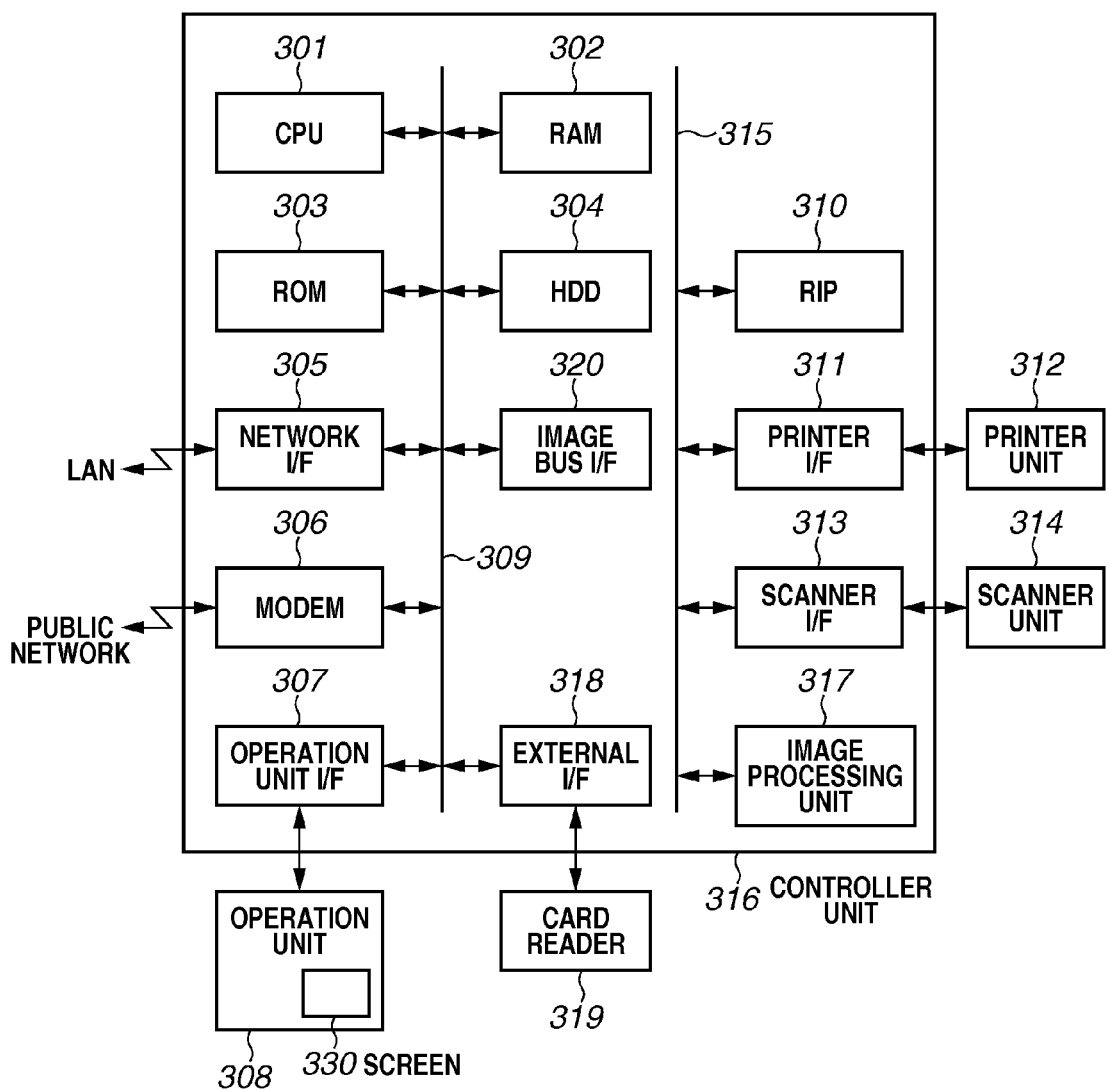
FIG. 3 is a block diagram illustrating a hardware configuration of the printing apparatus.

FIG. 3 is a block diagram illustrating a hardware configuration of the printing apparatus 600 illustrated in FIG. 1.

In FIG. 3, the printing apparatus 600 includes a controller unit 316, an operation unit 308, a card reader 319, a printer unit 312, and a scanner unit 314. The controller unit 316 controls operations of the operation unit 308, the card reader 319, the printer unit 312, and the scanner unit 314. Respective devices connected to a system bus 309 will be described below.

A CPU 301 is a processor for controlling the entire system. A RAM 302 is a system work memory for the CPU 301 to execute operations. The RAM 302 serves as a program memory for storing a program, or an image memory for temporarily storing image data. A ROM 303 serves as a memory for permanently storing data. A boot program and various control programs of the system are stored in the ROM 303.

A hard disk drive (HDD) 304 is an external storage device. The HDD 304 stores various programs for controlling the system, and image data. An authentication program and a printing program are stored in the HDD 304.

An operation unit I/F 307 is an interface unit for the operation unit 308. The operation unit I/F 307 outputs the image data that is to be displayed on the operation unit 308 to the operation unit 308. Further, the operation I/F 307 notifies the CPU 301 of the information (e.g., a user name, a card number, or a password) input by the user through the operation unit 308. A screen 330 serving as a display unit including a touch panel is disposed on the operation unit 308. The user presses or touches a button displayed on the screen 330 with the user's finger to input various instructions.

A network I/F 305 is a network interface. The network I/F 305 connects to the network such as the LAN to input and output data. A modulator-demodulator (MODEM) 306 connects to a public network to execute data input/output such as facsimile transmission/reception. An external interface (I/F) 318 may be a universal serial bus (USB), a serial bus compliant with the Institute of Electrical and Electronics Engineers (IEEE) 1394, a printer port, or a serial port compliant with the Recommended Standard (RS)-232C, which serves an interface unit for receiving an external input. The card reader 319 for reading the information within the IC card 700 is connected to the external I/F 318. The CPU 301 can control the card reader 319 to read information from the IC card 700 via the external I/F 318 to acquire the information read from the IC card 700.

An image bus I/F 320 is a bus bridge for connecting the system bus 309 to an image bus 315 for transmitting the image data at high speed to convert a data structure. The image bus 315 is configured of a peripheral component interconnect (PCI) bus or a serial bus compliant with the IEEE 1394.

Devices connected to the image bus 315 will be described.

A raster image processor (RIP) 310 rasterizes, for example, vector data such as a page-description language (PDL) code into a bitmap image. A printer I/F 311 connects the printer unit 312 to the controller unit 316 to execute synchronous/asynchronous conversion of the image data. A scanner I/F 313 connects the scanner unit 314 to the controller unit 316 to execute synchronous/asynchronous conversion of the image data.

An image processing unit 317 is a device for executing image processing. The image processing unit 317 corrects, processes, and edits the input image data, and executes correction of a printer and resolution conversion on the print output image data. Further, the image processing unit 317 executes rotation processing of image data, compression/decompression processing of multilevel image data according to JPEG, and compression/decompression processing of binary image data according to JBIG, Modified-Modified Read (MMR), or Modified-Huffman (MH).

The scanner unit 314 is a scanner mechanism. The scanner unit 314 illuminates an image on a sheet serving as a document, and scans the image with a charge coupled device (CCD) line sensor to convert the scanned image into raster image data in a form of an electric signal. The document is placed on a tray disposed on a document feeder. When the user provides a reading start instruction through the operation unit 308, the CPU 301 provides an instruction to the scanner unit 314. Thus, a document is fed from the document feeder one-by-one, so that the scanner unit 314 executes a reading operation of the document image.

The printer unit 312 is a printing mechanism. The printer unit 312 converts the raster image data into an image on a sheet. Although various conversion systems are provided, any conversion system such as an electro-photographic system using a photosensitive drum or a photosensitive belt, or an ink-jet system for directly printing an image on a sheet by discharging ink from a minute nozzle array may be employed. Activation of a printing operation is started according to an instruction from the CPU 301. Further, in order to allow users to select different sheet sizes and different sheet orientations, the printer unit 312 includes a plurality of sheet feeding stages and sheet cassettes corresponding to the sheet feeding stages.

The operation unit 308 receives an operation instruction from a user and displays an operation status. The operation unit 308 includes the screen 330 such as a liquid crystal display unit, and a touch panel sheet is attached to the liquid crystal display unit. The operation unit 308 displays an operation screen of the system, and notifies the CPU 301 of positional information via the operation unit I/F 307 when a button or a key displayed on the operation screen is touched.

Further, the operation unit 308 includes various operation keys such as a start key, a stop key, an identification (ID) key, and a reset key. The start key is used when a reading operation of a document image is to be started. A two-color light-emitting diode (LED) of green and red is disposed on the central portion of the start key, and the color thereof indicates whether the start key is in a usable state. The stop key functions to stop the operation in an operating state. The ID key is used when the user inputs a user ID of the user's. The reset key is used when a setting is to be initialized by the operation unit 308.

According to the control of the CPU 301, the card reader 319 reads the information stored in the IC card 700 and notifies the CPU 301 of the read information via the external I/F 318. For example, the Felica (registered trademark) from Sony Corporation may be used as the IC card 700.

With the above-described configuration, the printing apparatus 600 can transmit the image data read by the scanner unit 314 to the LAN 3, and print the print data received from the LAN 3 by the printer unit 312. Further, the printing apparatus 600 can perform facsimile transmission of the image data read by the scanner unit 314 to the public network via the MODEM 306, and print the image data received through the facsimile transmission via the public network by the printer unit 312.

Figure 4:
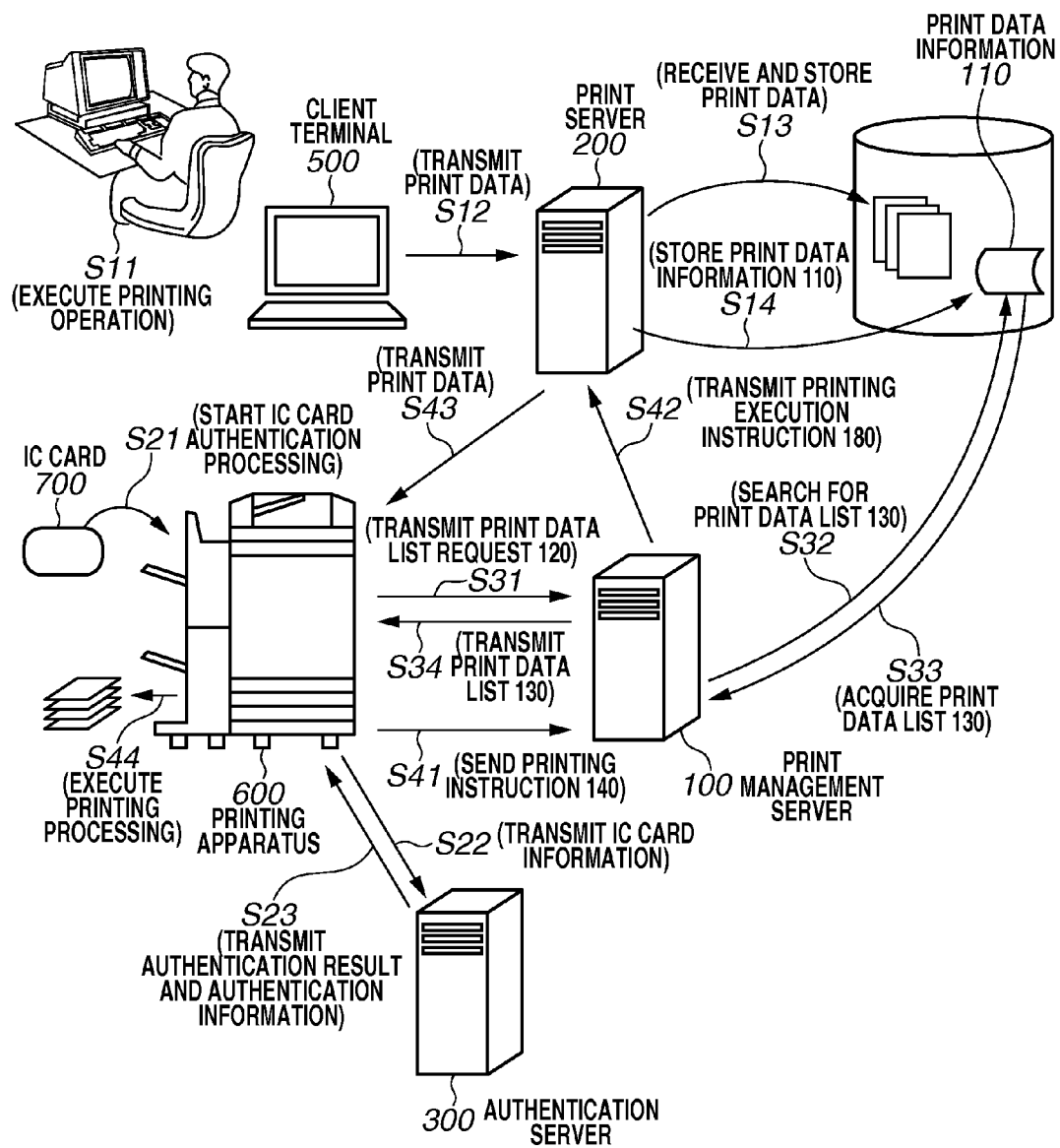
FIG. 4 is a diagram illustrating a basic operation of the printing system illustrated in FIG. 1.

FIG. 4 is a diagram illustrating a basic operation of the printing system 1 illustrated in FIG. 1. Hereinafter, the basic operation of the printing system 1 will be described with reference to FIG. 4.

In step S11, the user executes a printing operation through an application program executed on the client terminal 500. Application programs such as word processing software, spreadsheet software, and business form printing software are executed on the client terminal 500, and print data is created via the printer driver.

In step S12, the client terminal 500 transmits the print data to the print server 200 via a port of the printer driver through the network. The print server 200 operates as a virtual printing apparatus of the client terminal 500.

In step S13, the print server 200 receives and stores the print data in a storage unit of the print management server 100.

In step S14, the print server 200 creates and stores print data information 110 serving as the attribute information of the print data. In FIG. 4, the print data information 110 is stored in the print server 200. Alternatively, the print data information 110 may be stored in the print management server 100. The print data information 110 will be described below with reference to FIG. 6.

In step S21, when the user holds the IC card 700 over the card reader 319 connected to the printing apparatus 600, IC card authentication processing is started. The authentication processing is not limited to the authentication processing using the IC card. Other authentication processing such as authentication processing using a keyboard or biometric authentication processing may also be employed.

In step S22, the printing apparatus 600 reads the card information of the IC card 700 through the card reader 319 and transmits the card information to the authentication server 300.

When the authentication server 300 receives the card information from the printing apparatus 600 via the network, the authentication server 300 checks the card information with the authentication table and transmits an authentication result and authentication information (user identification information) to the printing apparatus 600 in step S23.

The printing apparatus 600 receives the authentication result from the authentication server 300 and ends the processing by displaying an error message if the authentication is not successful. In a case where the authentication is successful, in step S31, the printing apparatus 600 transmits a print data list request 120 to the print management server 100 based on the authentication information (user identification information). The print data list request 120 will be described below with reference to FIG. 6.

When the print management server 100 receives the print data list request 120 from the printing apparatus 600, then in steps S32, the print management server 100 searches the print data information 110 stored in the print server 200. In step S33, the print management server 100 acquires a print data list 130. The print data list 130 is a list of print data related to the authenticated user. The print data list 130 will be described below with reference to FIG. 7.

In step S34, the print management server 100 transmits the acquired print data list 130 to the printing apparatus 600. The printing apparatus 600 displays the received print data list 130 on the screen 330 of the operation unit 308.

In step S41, the user checks the print data list 130 displayed on the screen 330 of the operation unit 308 of the printing apparatus 600 and specifies the print data to provide a printing instruction. The printing instruction is provided through a touch panel of the operation unit 308, or a keyboard. The printing apparatus 600 receives the printing instruction from the user and transmits a printing instruction 140 to the print management server 100. The printing instruction 140 will be described below with reference to FIG. 8.

When the print management server 100 receives the printing instruction 140 from the printing apparatus 600, in step S42, the print management server 100 transmits a printing execution instruction 180 to the print server 200. The printing execution instruction 180 will be described below with reference to FIG. 12.

In step S42, when the print server 200 receives the printing execution instruction 180 from the print management server 100, in step S43, the print server 200 extracts and transmits the stored print data to the printing apparatus 600 via the network.

In step S44, the printing apparatus 600 executes printing processing of the print data and outputs a printed document.

The function units for executing the processing of steps S11 to S44 are included in the client terminal 500, the printing apparatus 600, the print server 200, the print management server 100, and the authentication server 300. The function units of the print server 200, the print management server 100, and the authentication server 300 may be included in a single server.

Next, the information exchanged between or stored in the print management server 100, the print server 200, the authentication server 300, and the printing apparatus 600 will be described with reference to FIGS. 5 to 9. With respect to the information exchanged between the above-described apparatuses, it is not necessary to exchange all of the items and only necessary items may be exchanged.

Figure 5:
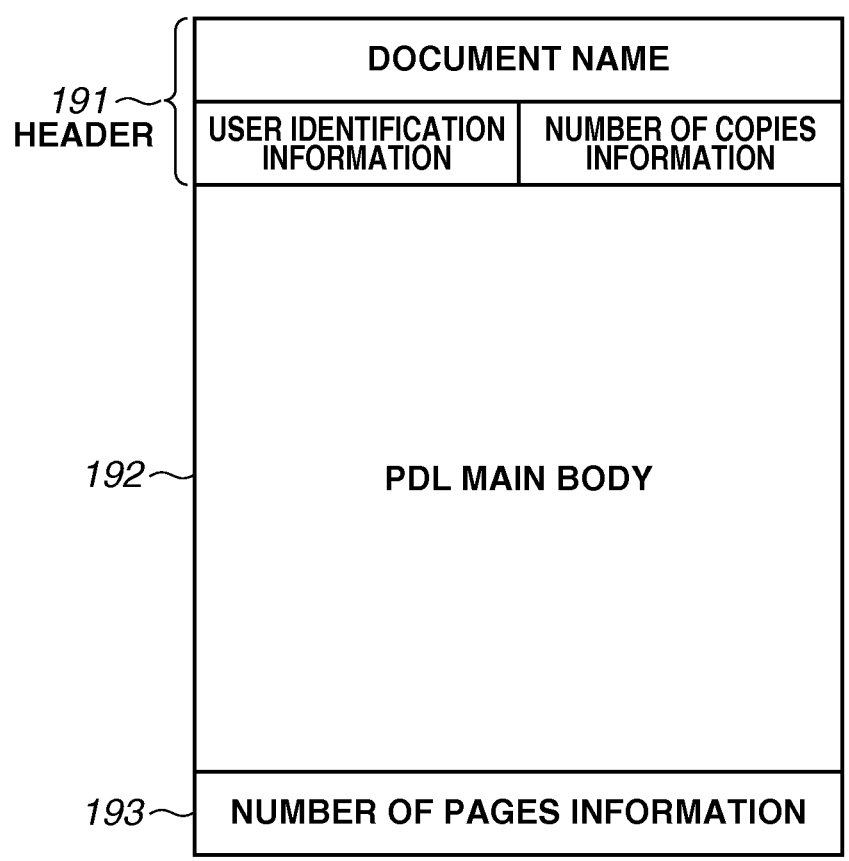
FIG. 5 is a diagram illustrating print data to be transmitted from a client terminal.

FIG. 5 is a diagram illustrating print data 190 transmitted from the client terminal 500 illustrated in FIG. 1.

In FIG. 5, the print data 190 is configured of a header 191 corresponding to identification information, a PDL main body 192, and number of pages information 193. The header 191 is configured of a document name, user information, and number of copies information. The document name is a character string indicating a document name of the print data 190. The document name is determined by an application program of the client terminal 500 that executes the printing operation.

The user information (user identification information) is a character string indicating owner information (user identification information) of the print data 190. The user information (user identification information) has to coincide with a user name of the authentication information (user identification information) transmitted from the authentication server 300. The PDL main body 192 is a page description language generated by the printer driver of the client terminal 500 that has executed the printing operation. Description that can be interpreted by the printing apparatus 600 to form a printed image is included in the PDL main body 192.

The number of pages information 193 indicates a total number of pages of the print data 190. Generally, because the number of pages cannot be determined until the printer driver of the client terminal 500 generates the page description language of the entire print data 190, the number of pages information 193 is attached to the end portion of the print data 190.

FIG. 6 is a table illustrating the print data information 110 stored in the print server 200 illustrated in FIG. 1.

In FIG. 6, the print data information 110 is the attribute information of the print data 190. Respective items such as a print data identifier 111, user information 112, a document name 113, a printing status 115, a receiving status 114, receiving date and time 116, processing 117 requested from the printing apparatus 600, a printing apparatus identifier 118, number of pages 119, and number of copies 129 are recorded in the print data information 110. The print data identifier (print data identification information) 111 is an identifier for uniquely managing the print data information 110.

The user information (user identification information) 112 is a character string indicating the owner information (user identification information) of the print data 190. The user identification information 112 is acquired from the header 191 of the print data 190.

The document name 113 is a character string indicating a document name of the print data 190. The document name 113 is acquired from the header 191 of the print data 190.

The printing status 115 indicates a printing status of the print data 190 in the printing apparatus 600. For example, the printing status 115 may be "0: UNPRINTED", "1: PRINTING", or "2: PRINTED". The receiving status 114 indicates a receiving status of the print data 190 in the print server 200. The receiving status 114 may be "0: RECEIVING", "1: RECEIVED", or "2: ERROR".

Starting date and time of the receiving processing are stored in the receiving date and time 116 when the print server 200 starts receiving the print data 190, and starting date and time are updated with ending date and time thereof when the print server 200 has received the print data 190.

The processing 117 indicates the processing requested to the print data 190 from the printing apparatus 600. For example, the processing 117 may be "0: UNDETERMINED", "1: PRINT", or "2: DELETE".

The printing apparatus identifier 118 is the identification information of the printing apparatus 600 that has requested the processing 117. Positional information on the network such as an internet protocol (IP) address may be used as the printing apparatus identifier 118. The number of pages 119 indicates the number of pages of the print data 190. The number of pages 119 is acquired from the number of pages information 193 transmitted at the end of the print data 190. The number of copies 129 indicates the number of copies of the print data 190 to be printed. The number of copies 129 is acquired from the header 191 of the print data 190.

FIG. 7 is a table illustrating a print data list request 120 transmitted to the print management server 100 from the printing apparatus 600 illustrated in FIG. 1.

In FIG. 7, items such as user information 121 and a printing apparatus identifier 122 are recorded in the print data list request 120. The user information 121 indicates a user name of the authentication information (user identification information) transmitted from the authentication server 300. For example, the user information 121 may be "suzuki". The printing apparatus identifier 122 is the identification information of the printing apparatus 600 that has transmitted the print data list request 120. Positional information on the network such as the IP address may be used as the printing apparatus identifier 122.

FIG. 8 is a table illustrating the print data list 130 transmitted to the printing apparatus 600 from the print management server 100 illustrated in FIG. 1.

In FIG. 8, items such as a print data identifier (print data identification information) 131, a document name 132, a receiving status 136, receiving date and time 135, a number of pages 133, and a number of copies 134 are recorded in the print data list 130. The above-described items are created based on the print data information 110 when the print management server 100 receives the print data list request 120 from the printing apparatus 600.

FIG. 9 is a table illustrating the printing instruction 140 transmitted to the print management server 100 from the printing apparatus 600.

In FIG. 9, items such as processing 141, a print data identifier (print data identification information) 142, and a printing apparatus identifier 146 are recorded in the printing instruction 140.

The processing 141 indicates a processing mode with respect to the print data 190. For example, the processing 141 may be "0: PRINT", or "1: DELETE".

The print data identifier (print data identification information) 142 is the identifier of the print data 190. The printing apparatus identifier 146 is the identification information of the printing apparatus 600 that has transmitted the print data list request 120. Positional information on the network such as the IP address may be used as the printing apparatus identifier 146.

Next, an operation of the printing system 1 according to the present exemplary embodiment will be described with reference to FIGS. 10A, 10B, to FIG. 18.

FIGS. 10A and 10B are flowcharts illustrating control methods of the information processing apparatus according to the present exemplary embodiment. In FIG. 10A, processing for generating the print data 190 through the printer driver executed on the client terminal 500 and processing for transmitting the print data 190 to the external print server 200 will be described as an example. Each processing step is realized when the CPU 201 of the client terminal 500 executes the control program (i.e., printer driver) stored in the external memory 211. In FIG. 10A, the processing executed by the printer driver includes print data generation processing performed in step S900) and print data transmission processing performed in step S910, and respective pieces of processing are operated independently. The print data generation processing in step S900 and the print data transmission processing in step S910 are executed independently because performance of the system is taken into consideration. The entire processing time can be reduced in comparison to the processing flow in which the printer driver transmits the print data 190 to the print server 200 after generating all of the print data 190.

First, in step S901, the printer driver of the client terminal 500 generates the header 191 based on the document name, the user information, the number of copies information specified by the application program.

Next, in step S902, the printer driver of the client terminal 500 converts the data generated by the application program into the PDL data (i.e., PDL main body 192) that can be interpreted by the printing apparatus 600. When the printer driver of the client terminal 500 executes the conversion processing on the entire data, the number of pages to be printed by the printing apparatus 600 is determined.

Then, in step S903, the printer driver of the client terminal 500 attaches the number of pages determined in step S902 to the print data 190 as the number of pages information 193, and ends the processing.

In the print data transmission processing in step S910 illustrated in FIG. 10A, the printer driver receives the print data 190 generated through the print data generation processing and transmits the print data 190 to the outside as one print data block when the received data amount has reached a predetermined amount. The number of print data blocks to be transmitted depends on the size of the print data 190. In the present exemplary embodiment, the print data 190 is transmitted through the transmission processing of four times.

In step S911, because the data amount of the header 191 generated in step S901 is small, the printer driver of the client terminal 500 outputs the header 191 to the external print server 200 together with a portion of the PDL main body 192 generated in step S902 as a first print data block.

Next, in steps S912 and S913, the printer driver of the client terminal 500 divides the remaining portion of the PDL main body 192 generated in step S902 into two portions and outputs the divided PDL main body 192 to the external print server 200 as a second and a third print data blocks.

In step S914, because the data amount of the number of pages information 193 generated in step S903 is small, the printer driver of the client terminal 500 outputs the number of pages information 193 to the external print server 200 together with a remaining portion of the PDL main body 192 generated in step S902 as a fourth print data block, and ends the processing.

According to the present exemplary embodiment illustrated in FIG. 10A, the transmission of the header 191 may be delayed caused by the generation processing of the PDL main body 192 executed in step S902. This is because a predetermined data amount cannot be achieved only with the header 191, and thus the header 191 will not be transmitted immediately. In order to transmit the header 191 as soon as possible to reflect the information on the print data information 110, the processing may be executed according to the flowchart illustrated in FIG. 10B. Processing illustrated in FIG. 10B is different in step S921 from the processing in FIG. 10A. In FIG. 10A, the first print data block will not be transmitted until a predetermined amount of the PDL main body 192 is generated. However, in step S921 of FIG. 10B, the header 191 is transmitted to the external print server 200 when the header 191 is generated in step S901.

In addition, respective elements of the print data 190 of the print data information 110 in the print management server 100 are not generated at once at a certain point of time.

FIG. 11 is a flowchart illustrating a data processing method of the printing system 1 according to the present exemplary embodiment. Hereinafter, processing for generating and updating the print data information 110 will be described in detail. However, with respect to the print data output processing executed by the client terminal 500, the print data generation processing and the print data transmission processing illustrated in FIGS. 10A and 10B are collectively described as one processing flow. Therefore, in FIG. 11, it looks as if the print data generation processing and the print data transmission processing are executed chronologically. However, in practice, the respective pieces of processing are executed concurrently. Hereinafter, description will be given of the data processing executed between the client terminal 500, the print server 200, and the print management server 100 which configure the printing system 1.

Respective processing steps illustrated in FIG. 11 are realized when the CPUs 201 of the client terminal 500, the print server 200, and the print management server 100 execute the execution programs stored in the external memories 211 on the RAMs 203.

First, in step S1001, the printer driver of the client terminal 500 transmits the header 191 to the print server 200 as a header of the print data 190. Next, in step S1002, the print server 200 receives the header 191 of the print data 190.

In step S1003, the CPU 201 of the print server 200 sends a notification for starting the receiving processing of the print data 190 to the print management server 100. At this time, the content of the header 191 is stored in the RAM 203 within the print server 200 in association with the print data 190. In step S1004, the CPU 201 of the print management server 100 receives the notification of starting the receiving processing of the print data 190 from the print server 200.

Then, in step S1005, the CPU 201 of the print management server 100 generates a print data identifier 111 corresponding to the print data 190 having started to be received by the print server 200, newly adds the print data 190 to the print data information 110, and records the corresponding print data identifier 111. Further, the CPU 201 of the print management server 100 records the receiving status 114 and the printing status 115 to "0: UNRECEIVED" and "0: UNPRINTED" respectively, and records the current time in the receiving date and time 116. The receiving date and time recorded in step S1005 is used in the time-out detection processing described below. Next, in step S1006, the CPU 201 of the print management server 100 notifies the print server 200 of the generated print data identifier 111.

In step S1007, the CPU 201 of the print server 200 receives the print data identifier 111 from the print management server 100. The print server 200 stores the received print data identifier 111 and the print data 190 in a receiving start state in the RAM 203 within the print server 200 in association with each other. From this point on, the print data 190 can be identified by the notification of the print data identifier 111 from the print management server 100.

In step S1008, the CPU 201 of the print server 200 reads the header 191 stored in step S1003 and extracts the user information, the document name, and the number of copies information.

In step S1009, the CPU 201 of the print server 200 transmits the extracted user information, the document name, and the number of copies information to the print management server 100 together with the print data identifier 111 received in step S1005. In step S1010, the CPU 201 of the print management server 100 receives the user information, the document name, and the number of copies information from the print server 200 together with the print data identifier 111. In step S1011, the CPU 201 of the print management server 100 identifies the print data 190 of the print data information 110 based on the received print data identifier 111, and records the received document name, the user information, and the number of copies information.

In step S1012, the printer driver of the client terminal 500 generates the PDL main body 192 of the print data 190. In step S1013, the printer driver of the client terminal 500 transmits the generated PDL main body 192 of the print data 190 to the print server 200. In step S1014, the CPU 201 of the print server 200 receives the PDL main body 192 of the print data 190 from the client terminal 500.

In step S1015, the printer driver of the client terminal 500 detects the number of pages information 193 of the print data 190. In step S1016, the printer driver of the client terminal 500 transmits the detected number of pages information 193 to the print server 200.

In step S1017, the CPU 201 of the print server 200 receives the number of pages information 193 of the print data 190 from the client terminal 500. In step S1018, the CPU 201 of the print server 200 transmits the received number of pages information 193 to the print management server 100 together with the print data identifier 111. In step S1019, the print management server 100 receives the number of pages information 193 and the print data identifier 111 from the CPU 201 of the print server 200.

In step S1020, the print management server 100 identifies the print data 190 in the print data information 110 based on the received print data identifier 111, and records the received number of pages information 193. Further, the print management server 100 updates the receiving status 114 of the print data information 110 to "1: RECEIVED". Furthermore, the print management server 100 updates the receiving date and time 116 of the print data information 110 to the current date and time, i.e., completion date and time of the receiving processing.

It should be noted that although each print data 190 is generated in the print data information 110 when data receiving processing is started in step S1004, data necessary for the print data list 130 such as the number of pages 119 can only be acquired in step S1020.

Figure 12:
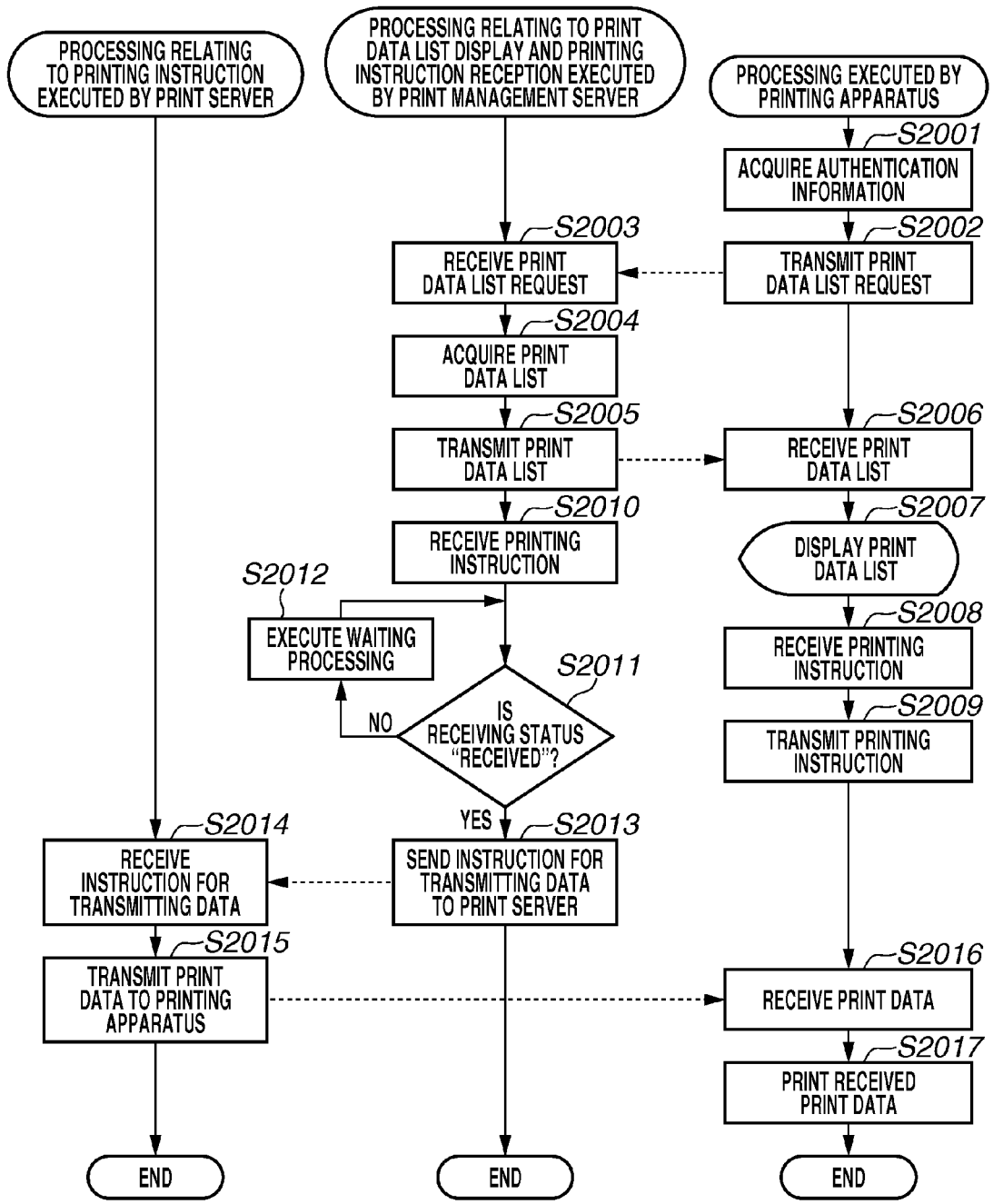
FIG. 12 is a flowchart illustrating a data processing method of the printing system.

FIG. 12 is a flowchart illustrating a data processing method executed in the printing system 1 according to the present exemplary embodiment. In the present exemplary embodiment, a list including the print data 190 in a receiving state is displayed on the printing apparatus 600, and a printing instruction with respect to the print data 190 in a receiving state is provided, so that the print data 190 is printed eventually. Respective processing steps illustrated in FIG. 12 are realized when the CPUs 201 of the print server 200 and the print management server 100 execute the execution programs stored in the external memories 211 on the RAMs 203. Further, the processing of the printing apparatus 600 is realized when the CPU 301 executes the control program stored in the HDD 304.

In the flowchart illustrated in FIG. 12, it should be noted that only the processing for receiving the printing instruction and the processing to be executed in response to the printing instruction are described as the processing executed by the print server 200. In other words, although the receiving processing of the print data 190 executed by the print server 200 in FIG. 11 is not illustrated in FIG. 12, the receiving processing thereof is executed in concurrent with the processing in FIG. 12, so as to have an influence over the below-described receiving status change in step S2011. Similarly, in the flowchart of FIG. 12, only the processing related to the print data list 130 and the processing to be executed in response to the printing instruction are described as the processing executed by the print management server 100. However, the update processing of the print data information 110 related to the completion of the transmission processing of the print data 190 illustrated in FIG. 11 is executed in concurrent with the processing in FIG. 12.

In step S2001, when the user holds the IC card 700 over the card reader 319 connected to the printing apparatus 600, the CPU 301 starts the IC card authentication processing. The CPU 301 of the printing apparatus 600 reads the card information of the IC card 700 through the card reader 319 and transmits the card information to the authentication server 300. The authentication server 300 receives the card information from the printing apparatus 600 via the network, checks the card information with the authentication table, and transmits the authentication result and the authentication information (user identification information) to the printing apparatus 600. The printing apparatus 600 acquires the authentication result and the authentication information (user identification information) of the user. In a case where the authentication is successful, the printing apparatus 600 acquires the authentication success information (authentication result) and the authentication information (user identification information) from the authentication server 300. Further, instead of using the IC card 700, the user may input the user identification information (e.g., a user name, a password, and a domain name) through the operation unit 308 of the printing apparatus 600, so that the authentication processing is executed according to the input information.

In step S2002, based on the authentication information (user identification information), the printing apparatus 600 transmits the print data list request 120 related to the authenticated user to the print management server 100 (i.e., transmission of the user identification information).

In the present exemplary embodiment, the print data list request 120 is configured to include the user information 121 (user identification information) and the printing apparatus identifier 122. However, the print data list request 120 may include only the user information 121 (user identification information). In such a case, the IP address may be acquired as the printing apparatus identifier 122 through the TCP/IP.

In step S2003, the print management server 100 receives the print data list request 120 (i.e., reception of user identification information).

In step S2004, the print management server 100 searches the print data information 110 of FIG. 6 for the print data 190 matching the user information 121 (user identification information) included in the print data list request 120 to acquire the print data list 130. In addition, the print data list 130 can be realized even if not all of the items 131 to 136 illustrated in FIG. 8 are transmitted. For example, in a case where the print data 190 is being transmitted to the printing apparatus 600 from the client terminal 500, the number of pages 133 includes no data.

In step S2005, the print management server 100 transmits the print data list 130 to the printing apparatus 600.

In step S2006, the CPU 301 of the printing apparatus 600 receives the print data list 130. This print data list 130 is stored in the RAM 302 of the printing apparatus 600.

Next, in step S2007, the CPU 301 of the printing apparatus 600 displays a print data list screen 5000 as illustrated in FIG. 13 on the screen 330 of the operation unit 308. A document name 5001, a number of pages 5002, a number of copies 5003, and date and time 5004 are displayed on the print data list screen 5000. Further, a single piece of print data 190 is displayed on a single row in the print data list screen 5000 (i.e., display of print data list).

On the print data list screen 5000, the CPU 301 of the printing apparatus 600 checks the receiving status 136 of each print data 190. For example, if the print data 190 is being received, the corresponding print data 190 is displayed in gray while "RECEIVING" is displayed on a column of the date and time 5004 as illustrated in a row 5020 of the print data list screen 5000 in FIG. 13. By displaying the above-described print data list screen 5000, the user can understand that the print data 190 having the document name 5001 of "QUOTATION B" is being transmitted.

In step S2008, the user selects the print data 190 by checking the print data list screen 5000 displayed on the screen 330 of the operation unit 308 of the printing apparatus 600, and provides a printing instruction of the selected print data 190.

In the print data list screen 5000 illustrated in FIG. 13, the print data 190 can be selected through a touch panel system. The printing apparatus 600 determines whether the print data 190 is specified on the print data list screen 5000. The selected print data 190 is highlighted on the background displayed in inverted color. A box 5005 positioned at the head of the document name 5001 in a selected row is set to a selected state. The box 5005 can be toggled to a selected or a non-selected state. If the row in a selected state is selected again, the box 5005 at the head of the document name 5001 is toggled to a non-selected state. A button ("SELECT ALL") 5006 is a button for setting all the pieces of print data 190 displayed on the print data list screen 5000 to the selected state. A button ("CLEAR SELECTION") 5007 is a button for setting all the pieces of print data 190 displayed on the print data list screen 5000 to the non-selected state. Buttons 5011 are used for scrolling the print data list screen 5000.

A button ("RESERVE") 5009 is a button for receiving a printing reservation instruction. A printing instruction of the print data 190 in a receiving state is performed by making a printing reservation. The button 5009 may be integrated into a button ("PRINT") 5010. The processing proceeds to step S2009 when the button 5009 is pressed.

In step S2009, the printing apparatus 600 transmits the printing instruction 140 (see FIG. 9) to the print management server 100. In step S2010, the print management server 100 receives the printing instruction 140 (i.e., reception of printing instruction information). The print management server 100 identifies the print data 190 from the print data information 110 based on the printing instruction 140 (i.e., print data identifier (print data identification information)). In step S2011, the print management server 100 reads the receiving status 114 of the identified print data 190 from the print data information 110 and determines whether the receiving status 114 is "RECEIVED".

In step S2011, if the print management server 100 determines that the receiving status 114 of the print data 190 is "0: UNRECEIVED" (NO in step S2011), the processing proceeds to step S2012. In step S2012, the print management server 100 executes waiting processing to wait until the receiving processing of the print data 190 is completed. A period for executing the waiting processing is defined by a setting file stored in the print management server 100.

In step S2011, if the print management server 100 determines that the receiving status 114 of the print data 190 is "1: RECEIVED" (YES in step S2011), the processing proceeds to step S2013. In step S2013, the print management server 100 notifies the print server 200 of a transmission request of the print data 190. At this time, the print data identifier 111 for identifying the print data 190 and the printing apparatus identifier 118 corresponding to the print data 190 are also read from the print data information 110 and transmitted together with the transmission request.

In step S2014, the print server 200 receives the transmission request of the print data 190 together with the print data identifier 111 and the printing apparatus identifier 118. The print server 200 identifies the print data 190 based on the received print data identifier 111.

In step S2015, the print server 200 transmits the identified print data 190 to the IP address indicated by the received printing apparatus identifier 118. In step S2016, the printing apparatus 600 receives the print data 190 from the print server 200.

In step S2017, the printing apparatus 600 executes the output processing of the print data 190 received from the print server 200.

Figure 14:
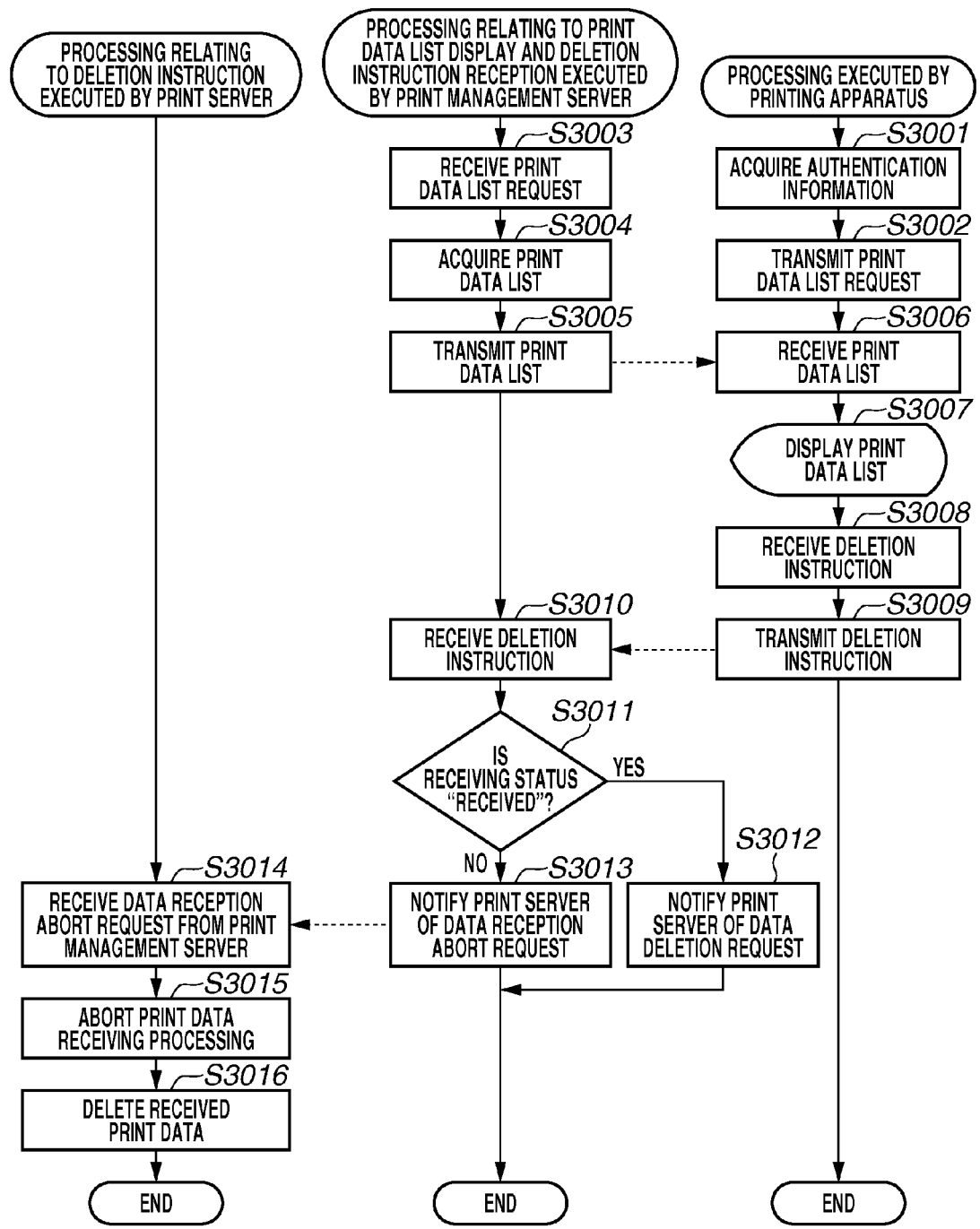
FIG. 14 is a flowchart illustrating a data processing method of the printing system.

FIG. 14 is a flowchart illustrating a data processing method executed in the printing system 1 according to the present exemplary embodiment. In the present exemplary embodiment, processing for deleting a print job included in a list displayed on the screen 330 of the printing apparatus 600 will be described as an example. Respective processing steps illustrated in FIG. 14 are realized when the CPUs 201 of the print server 200 and the print management server 100 execute the execution programs stored in the external memories 211 on the RAMs 203. Further, the processing of the printing apparatus 600 will be realized when the CPU 301 executes the control program stored in the HDD 304.

In the flowchart illustrated in FIG. 14, it should be noted that only receiving processing of a reception abort request and the processing to be executed in response to the reception abort request are described with respect to the processing executed by the print server 200. In other words, although the receiving processing of the print data 190 executed by the print server 200 in FIG. 11 is not illustrated in FIG. 14, the receiving processing thereof is executed in concurrent with the processing in FIG. 14, so as to have an influence over the below-described processing relating to the receiving status executed in step S3011. Similarly, in the flowchart illustrated in FIG. 14, only the processing relating to the print data list 130 and the processing to be executed in response to a deletion instruction are described with respect to the processing executed by the print management server 100. However, the update processing of the print data information 110 due to completion of the transmission processing of the print data 190 illustrated in FIG. 11 is executed in concurrent with the processing in FIG. 14.

In addition, the processing in steps S3001 to S3007 is similar to that executed in steps S2001 to S2007 in FIG. 12, and thus description thereof will be omitted.

In step S3008, the user selects the print data 190 in a receiving state by checking the print data list screen 5000 displayed on the screen 330 of the operation unit 308 of the printing apparatus 600, and provides a deletion instruction of the print data 190. In other words, the user presses the button 5008 ("DELETE") to input the deletion instruction of the print data 190.

In step S3009, the printing apparatus 600 transmits a deletion instruction 170 (see FIG. 18) to the print management server 100.

In step S3010, the print management server 100 receives the deletion instruction 170. The print management server 100 identifies the print data 190 from the print data information 110 based on the deletion instruction 170 (i.e., print data identifier (print data identification information)). In step S3011, the print management server 100 reads the receiving status 114 of the identified print data 190 from the print data information 110 and determines whether the receiving status 114 is "RECEIVED".

In step S3011, if the print management server 100 determines that the receiving status 114 of the print data 190 is "1: RECEIVED" (YES in step S3011), the processing proceeds to step S3012. In step S3012, the print management server 100 notifies the print management server 100 of a data deletion request together with the print data identifier 111. In step S3011, if the print management server 100 determines that the receiving status 114 of the print data 190 is "0: UNRECEIVED" (NO in step S3011), the processing proceeds to step S3013. In step S3013, the print management server 100 notifies the print server 200 of a reception abort request of the print data 190 together with the print data identifier 111.

In step S3014, the print server 200 receives the reception abort request of the print data 190 together with the print data identifier 111. In step S3015, the print server 200 identifies the print data 190 from the print data identifier 111 received in step S3014 and aborts the receiving processing of the print data 190. In step S3016, the print server 200 deletes the received print data 190 before terminating the processing.

Figure 15:
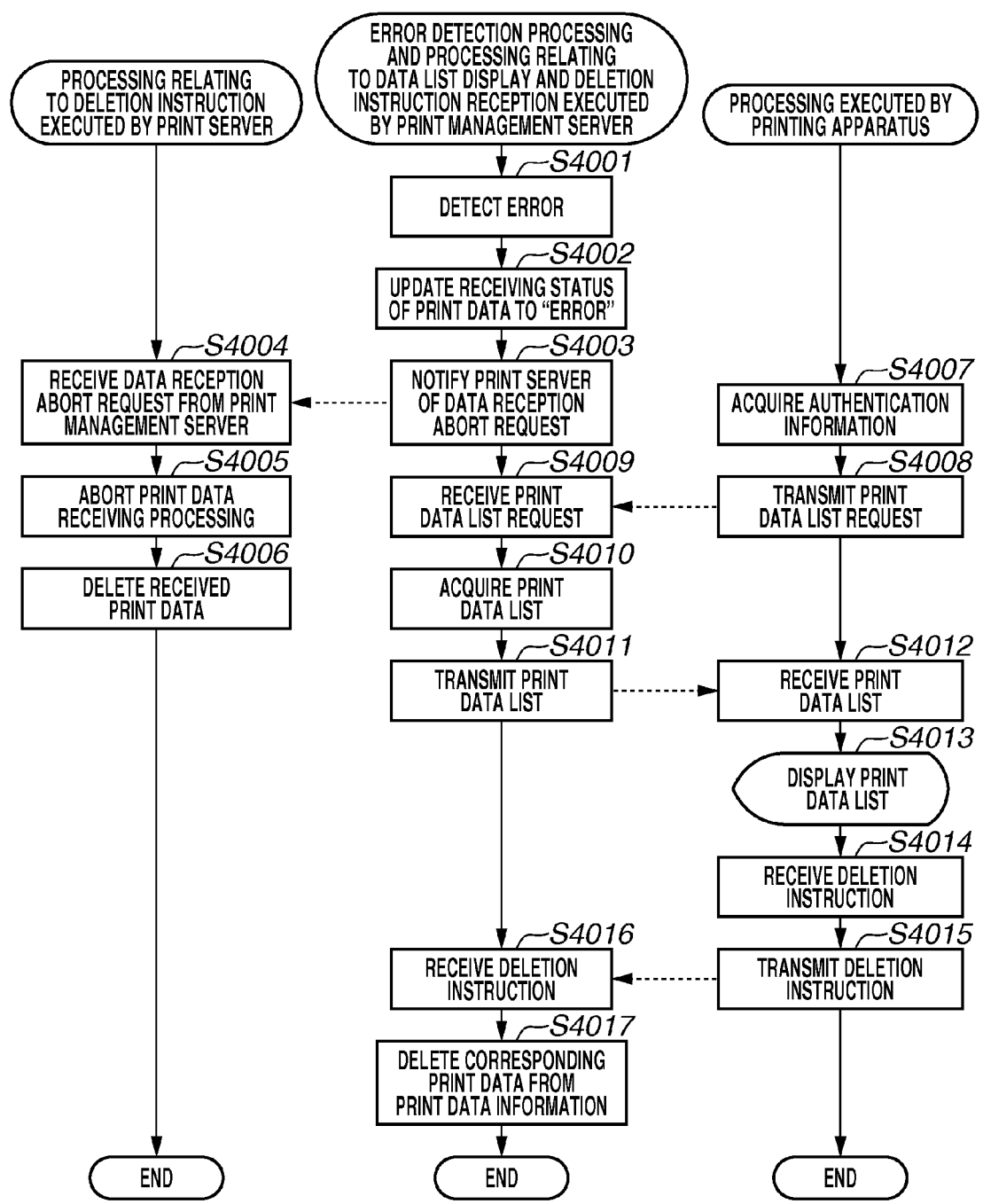
FIG. 15 is a flowchart illustrating a data processing method of the printing system.

FIG. 15 is a flowchart illustrating a data processing method executed in the printing system 1 according to a present exemplary embodiment. In the present exemplary embodiment, description will be given to an example of processing relating to an error occurring in a receiving period of the print data 190 by the print server 200. The processing is executed when the print server 200 cannot continue the receiving processing because of the error while the print management server 100 receives the print data list request 120 from the printing apparatus 600. Respective processing steps illustrated in FIG. 15 are realized when the CPUs 201 of the print server 200 and the print management server 100 execute the execution programs stored in the external memories 211 on the RAMs 203. Further, the processing of the printing apparatus 600 will be realized when the CPU 301 executes the control program stored in the HDD 304.

In step S4001, the print management server 100 detects a reception error. At that time, a generation cause of the reception error is not taken into consideration. The reception error may be detected when a reception time-out occurs in the print data 190 because transmission thereof is stopped for some reasons and the print data 190 has remained in a receiving state for more than a predetermined time period, other than when the receiving processing of the print data 190 is interrupted by an error occurring in the communication protocol. In order to detect the reception time-out, the print management server 100 may check the time recorded in the receiving time and date 116 of the print data 190 having the receiving status 114 of "0: RECEIVING" in the print data information 110 to determine whether a predetermined time or longer has elapsed.

In step S4002, the print management server 100 updates the receiving status 114 of the print data 190 having an error in the print data information 110 to "2: ERROR (ABNORMAL)" from "0: RECEIVING". In step S4003, the print management server 100 notifies the print server 200 of the reception abort request of the print data 190 together with the print data identifier 111.

In step S4004, the print server 200 receives the reception abort request of the print data 190 together with the print data identifier 111. In step S4005, the print server 200 identifies the print data 190 from the print data identifier 111 received in step S4004 and aborts the receiving processing of that print data 190.

In step S4006, the print server 200 deletes the received print data 190 before terminating the processing.

In step S4007, when the user holds the IC card 700 over the card reader 319 connected to the printing apparatus 600, the IC card authentication processing is started. The printing apparatus 600 reads the card information of the IC card 700 through the card reader 319 and transmits the card information to the authentication server 300. The authentication server 300 receives the card information from the printing apparatus 600 via the network, collates the card information with the authentication table, and transmits the authentication result and the authentication information (user identification information) to the printing apparatus 600. The printing apparatus 600 acquires the authentication result and the authentication information (user identification information) of the user. In a case where the authentication is successful, the printing apparatus 600 acquires the authentication success information (authentication result) and the authentication information (user identification information) from the authentication server 300.

In step S4008, based on the authentication information (user identification information), the printing apparatus 600 transmits the print data list request 120 relating to the authenticated user to the print management server 100 (i.e., transmission of the user identification information). In step S4009, the print management server 100 receives the print data list request 120 (i.e., reception of user identification information).

In step S4010, the print management server 100 searches the print data information 110 in FIG. 6 for the print data 190 coinciding with the user information 121 (user identification information) included in the print data list request 120 to acquire the print data list 160 illustrated in FIG. 17. In step S4011, the print management server 100 transmits the print data list 160 (see FIG. 17) to the printing apparatus 600. In step S4012, the printing apparatus 600 receives the print data list 160 (see FIG. 17). The print data list 160 is stored in the RAM 302 of the printing apparatus 600.

Figure 16:
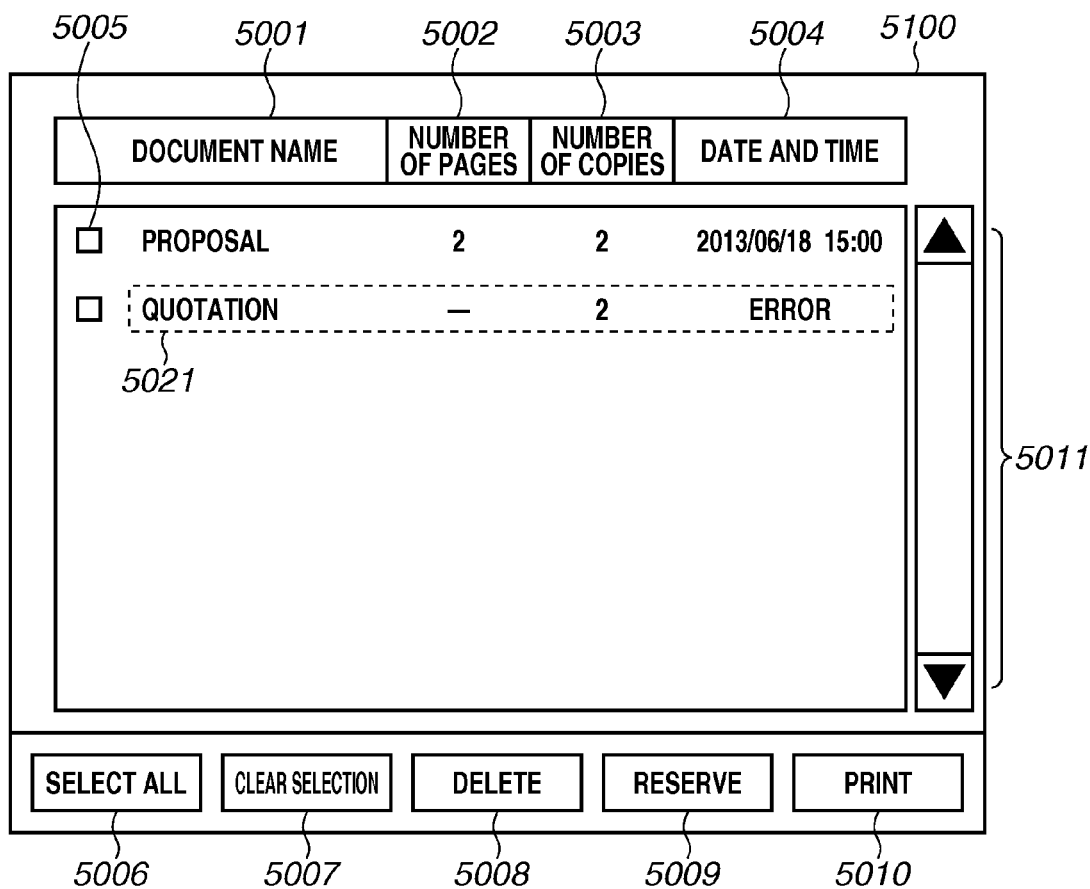
FIG. 16 is diagram illustrating a UI screen displayed on the printing apparatus.

In step S4013, the printing apparatus 600 displays a print data list screen 5100 (see FIG. 16) on the screen 330 of the operation unit 308. A document name 5001, a number of pages 5002, a number of copies 5003, and a date and time 5004 are displayed on the print data list screen 5100. Further, a single piece of print data 190 is displayed in a single row in the print data list screen 5100 (i.e., display of print data list).

In the print data list screen 5100, the printing apparatus 600 checks the receiving status 136 of each piece of the print data 190. For example, if the receiving status 136 is "ERROR", the print data 190 is displayed in red while "ERROR" is displayed on a column of the date and time 5004 as illustrated in a row 5021 in FIG. 16. With the above-described display, the user can understand that the error has occurred in a transmission period of the print data 190 having the document name 5001 of "INVOICE".

In step S4014, the user selects the print data 190 by checking the print data list screen 5100 displayed on the screen 330 of the operation unit 308 of the printing apparatus 600, and provides a deletion instruction of the print data 190. In other words, the user presses the button 5008 ("DELETE") to input the deletion instruction of the print data 190. In step S4015, the printing apparatus 600 transmits the deletion instruction 170 (see FIG. 18) to the print management server 100.

In step S4016, the print management server 100 receives the deletion instruction 170. The print management server 100 identifies the print data 190 from the print data information 110 based on the deletion instruction 170 (i.e., print data identifier (print data identification information)).

In step S4017, the print management server 100 deletes the identified print data 190 from the print data information 110 and terminates the processing.

As described above in detail, in the printing system 1 according to the exemplary embodiment of the present invention, the printing apparatus 600 receives a list that includes the print data 190 in a receiving state from the print management server 100 and displays the list on a screen. Accordingly, it is possible to prevent the inconvenience in which the print data 190 printing processing of which has been instructed by the user through the client terminal 500 cannot be found in a list on a display screen of the printing apparatus 600.

Each processing step described in the present invention can be realized by causing a processing device (i.e., a CPU or a processor) such as a personal computer (i.e., a computer) to execute software (i.e., a program) acquired through a network or various storage media.

The present invention is not limited to the above-described exemplary embodiments, and various modifications and changes (including an organic combination of the exemplary embodiments) are possible based on the gist of the present invention. Therefore, such modifications and changes should not be excluded from the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-132527, filed Jun. 27, 2014, which is hereby incorporated by reference herein in its entirety.

What is claimed is:

1. An image forming apparatus using an image forming unit configured to form an image based on print data and a display unit configured to display information and communicating with an external device, the image forming apparatus comprising:

a controlling portion having a processor which executes instructions stored in a memory or having circuitry, the controlling portion being configured to:
acquire information about print data that is to be received but has not yet been received by the external device;
cause the display unit to display a screen for enabling a printing instruction for causing the image forming unit to form an image to be provided, based on the information of the print data that has not yet been received by the external device; and
after the printing instruction is provided, cause the image forming unit to form an image according to the print data, that has not vet been received by the external device, having been received.

2. The image forming apparatus according to claim 1, wherein the controlling portion is further configured to:
acquire information of print data that is to be received and has been received by the external device; and
cause the display unit to display a list screen for enabling print data, for which a printing instruction is to be provided, to be selected from among a plurality of pieces of print data,
wherein the controlling portion performs control to display the information of print data that has been received by the external device and the information of print data that has not yet been received by the external device in a distinguishable manner.

3. The image forming apparatus according to claim 1, wherein the controlling potion is further configured to:
cause the display unit to display a list screen for enabling print data, for which a printing instruction is to be provided, to be selected from a list including a plurality of pieces of print data; and
cause the external device to stop receiving the print data selected on the list screen.

4. A method for controlling an image forming apparatus which uses an image forming unit configured to form an image based on print data, a display unit configured to display information, and a controlling portion having a processor which executes instructions stored in a memory or having circuitry, the image forming apparatus being configured to communicate with an external device, the method comprising:
acquiring information of print data that is to be received but has not yet been received by the external device;
causing the display unit to display a screen for enabling a printing instruction for causing the image forming unit to form an image to be provided, based on the information of the print data that has not yet been received by the external device; and
after the printing instruction is provided, cause the image forming unit to form an image according to the print data, that has not vet been received by the external device, having been received.

5. A non-transitory storage medium storing a program for causing a computer to execute a method for controlling an image forming apparatus which uses an image forming unit configured to form an image based on print data and a display unit configured to display information, and a controlling portion having a processor which executes instructions stored in a memory or having circuitry, the image forming apparatus being configured to communicate with an external device, the method comprising:
acquiring information of print data that is to be received but has not yet been received by the external device;
causing the display unit to display a screen for enabling a printing instruction for causing the image forming unit to form an image to be provided, based on the information of the print data that has not yet been received by the external device; and
after the printing instruction is provided, cause the image forming unit to form an image according to the print data, that has not vet been received by the external device, having been received.

6. An image forming system comprising a server and image forming apparatus, wherein
the server starts reception of print data from an external apparatus,
the server transmits identification information of the print data to the image forming apparatus,
the image forming apparatus displays, in a state where the server has not completed the reception of the print data, a screen which allows a user to provide an instruction for image forming of the print data based on the identification information,
the image forming apparatus accepts the instruction for image forming of the print data from the user and
the image forming apparatus transmits, to the server, a request for transmitting the print data,
the server accepts the request and transmits the print data to the image forming apparatus after the reception of the print data has been completed, and
the image forming apparatus receives the print data and forms an image on a sheet based on the print data.

7. The image forming system according to claim 6, wherein the image forming apparatus forms an image on a sheet using an image forming device.

8. The image forming system according to claim 6, wherein the image forming apparatus displays the screen using a display device.

9. The image forming system according to claim 6, wherein the image forming apparatus acquires, from the server, a list of a plurality of pieces of identification information including the identification information.

10. The image forming system according to claim 6, wherein the image forming apparatus acquires user information of an operator and transmits, to the server, a request for the list of identification information based on the acquired user information.

11. The image forming system according to claim 6, wherein, in a state where the sever has not completed the reception of the print data, the image forming apparatus transmits, to the server, a request for transmitting the print data.

12. The image forming system according to claim 6, wherein the server receives the identification information from the external apparatus and then receives the print data from the external apparatus.

13. The image forming system according to claim 6, wherein the server receives information about a number of pages of the print data from the external apparatus after the reception of the print data.

14. The image forming system according to claim 6,
wherein the image forming apparatus transmits a specific request regarding the identification information based on a user instruction, and
wherein, the server cancels the reception in a case where the print data is being received when the specific request is accepted and deletes the print data in a case where the reception of the print data has been completed when the specific request is accepted.

15. The image forming system according to claim 6, wherein a first print job for which the server has not completed the reception of the print data and a second print job for which the server has completed the reception of the print data are displayed on the screen.

16. The image forming system according to claim 15, wherein a print job for which the server has not completed the reception of the print data and a print job for which the server has completed the reception of the print data are displayed on the screen in a distinguishable manner.

17. The image forming system according to claim 15, wherein the screen includes a first object for instructing execution of the first print job and a second object for instructing execution of the second print job.

18. An image forming system comprising a server and image forming apparatus:
wherein
the server is configured to perform:
start processing for starting reception of print data from an external apparatus;
first transmission processing for transmitting identification information of the print data to the image forming apparatus;
acceptance processing for accepting a request for transmitting the print data using the identification information from the image forming apparatus; and
second transmission processing for transmitting the requested print data to the image forming apparatus after the reception of the print data has been completed, and
the image forming apparatus is configured to perform:
first acquisition processing for acquiring the identification information of the print data transmitted from the server in the first transmission processing;
display processing for displaying a screen which allows a user to provide an instruction for image forming based on the print data based on the identification information received in the first acquisition processing in a state where the server has not completed the reception of the print data;
acceptance processing for accepting the instruction for image forming based on the print data from the user;
request processing for requesting the server for the print data based on the instruction;
second acquisition processing for acquiring the print data transmitted in the second transmission processing; and
image forming processing for forming an image on a sheet based on the print data acquired in the second acquisition processing.

19. The image forming system according to claim 18, wherein the image forming apparatus forms an image on a sheet using an image forming device.

20. The image forming system according to claim 18, wherein the image forming apparatus displays the screen using a display device.

21. The image forming system according to claim 18, wherein the image forming apparatus acquires, from the server, a list of a plurality of pieces of identification information including the identification information.

22. The image forming system according to claim 18, wherein the image forming apparatus acquires user information of an operator and transmits, to the server, a request for the list of identification information based on the acquired user information.

23. The image forming system according to claim 18, wherein, in a state where the sever has not completed the reception of the print data, the image forming apparatus transmits, to the server, a request for transmitting the print data.

24. The image forming system according to claim 18, wherein the server receives the identification information from the external apparatus and then receives the print data from the external apparatus.

25. The image forming system according to claim 18, wherein the server receives information about a number of pages of the print data from the external apparatus after the reception of the print data.

26. The image forming system according to claim 18,
wherein the image forming apparatus transmits a specific request regarding the identification information based on a user instruction, and
wherein, the server cancels the reception in a case where the print data is being received when the specific request is accepted and deletes the print data in a case where the reception of the print data has been completed when the specific request is accepted.

27. The image forming system according to claim 18, wherein a first print job for which the server has not completed the reception of the print data and a second print job for which the server has completed the reception of the print data are displayed on the screen.

28. The image forming system according to claim 27, wherein a print job for which the server has not completed the reception of the print data and a print job for which the server has completed the reception of the print data are displayed on the screen in a distinguishable manner.

29. The image forming system according to claim 27, wherein the screen includes a first object for instructing execution of the first print job and a second object for instructing execution of the second print job.

* * * * *